(12) United States Patent
Caffee et al.

(10) Patent No.: US 10,254,176 B2
(45) Date of Patent: Apr. 9, 2019

(54) STRAIN-INSENSITIVE TEMPERATURE SENSOR

(71) Applicant: Silicon Laboratories Inc., Austin, TX (US)

(72) Inventors: Aaron J. Caffee, Scappoose, OR (US); Jeffrey L. Sonntag, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 1086 days.

(21) Appl. No.: 14/246,461

(22) Filed: Apr. 7, 2014

(65) Prior Publication Data

US 2015/0285691 A1   Oct. 8, 2015

(51) Int. Cl.
*G01K 7/00* (2006.01)
*G01K 7/24* (2006.01)

(52) U.S. Cl.
CPC ........................... *G01K 7/24* (2013.01)

(58) Field of Classification Search
CPC .................. G01K 7/24; G01K 7/25
See application file for complete search history.

(56) References Cited

U.S. PATENT DOCUMENTS

| | | | |
|---|---|---|---|
| 6,150,803 A * | 11/2000 | Varga | H02M 3/1584 307/60 |
| 6,954,020 B2 | 10/2005 | Ma et al. | |
| 7,224,210 B2 | 5/2007 | Garlapati et al. | |
| 7,253,677 B1 | 8/2007 | Kuramochi | |
| 7,321,225 B2 | 1/2008 | Garlapati et al. | |
| 7,724,068 B1 | 5/2010 | Smith et al. | |
| 7,852,144 B1 | 12/2010 | Lonte | |
| 7,854,174 B2 | 12/2010 | Aebersold et al. | |
| 7,982,550 B1 | 7/2011 | Quevy et al. | |

(Continued)

FOREIGN PATENT DOCUMENTS

WO   WO 2013114289 A1 *   8/2013   ............ G01K 1/20

OTHER PUBLICATIONS

Malik, S.Q. et al. "A low temperature sensitivity switched-capacitor current reference", ECCTD'01European Conference on Circuit Theory and Desing. Aug. 28-31, 2001, pp. I-269-I-272.*

(Continued)

*Primary Examiner* — Lisa Caputo
*Assistant Examiner* — Janice M Soto
(74) *Attorney, Agent, or Firm* — Zagorin Cave LLP (57) ABSTRACT

An apparatus includes a thermistor having a variable resistance with a first dependence on absolute temperature. The apparatus includes a reference resistor having a resistance with a second dependence on absolute temperature, the second dependence being less than or having opposite polarity to the first dependence. The reference resistor includes a switched-capacitor circuit. The apparatus includes a node coupled between the thermistor and the reference resistor. The node is configured to provide a signal indicative of absolute temperature based on the variable resistance and the reference resistance. The signal may be strain-invariant, proportional to a reference voltage, and indicative of a ratio of the variable resistance to the reference resistance. The apparatus may include a feedback circuit configured to maintain the node at a predetermined voltage level.

17 Claims, 4 Drawing Sheets

(56) References Cited

U.S. PATENT DOCUMENTS

| | | |
|---|---|---|
| 2007/0247245 A1 | 10/2007 | Hagelin |
| 2007/0273407 A1* | 11/2007 | Ueda ............... H03K 19/00384 326/83 |
| 2007/0290763 A1 | 12/2007 | Partridge et al. |
| 2008/0007362 A1 | 1/2008 | Partridge et al. |
| 2009/0051342 A1 | 2/2009 | Peng |
| 2009/0121808 A1 | 5/2009 | Van Beek et al. |
| 2010/0225483 A1 | 9/2010 | Scheucher et al. |
| 2011/0057709 A1 | 3/2011 | Laraia et al. |
| 2011/0254613 A1 | 10/2011 | Kim |
| 2012/0043999 A1 | 2/2012 | Quevy et al. |
| 2012/0133448 A1 | 5/2012 | Gregg et al. |
| 2012/0133848 A1 | 5/2012 | Williamson |
| 2012/0161741 A1 | 6/2012 | Lambetti |
| 2012/0268216 A1 | 10/2012 | Borremans |
| 2012/0274410 A1 | 11/2012 | Koyama |
| 2013/0106497 A1 | 5/2013 | Lutz et al. |
| 2013/0239695 A1 | 9/2013 | Tai |
| 2014/0375135 A1* | 12/2014 | Nervegna ............. G01N 27/26 307/86 |

OTHER PUBLICATIONS

Perrott, Michael H. et al., "A Temperature-to-Digital Converter for a MEMS-Based Programmable Oscillator With < ±0.5-ppm Frequency Stability and < 1-ps Integrated Jitter," IEEE Journal of Solid-State Circuits, vol. 48, No. 1, Jan. 2013, pp. 276-291.

Putter, B.M., "On-chip RC measurement and calibration circuit using Wheatstone bridge," IEEE International Symposium on Circuits and Systems, 2008. ISCAS 2008, May 18-21, 2008, pp. 1496-1499.

\* cited by examiner

STRAIN-INSENSITIVE TEMPERATURE SENSOR

BACKGROUND

Field of the Invention

This application relates to integrated circuits and more particularly to integrated circuit temperature sensors.

Description of the Related Art

Sensing temperature on an integrated circuit requires taking measurements using integrated circuit devices that have temperature-sensitive electronic behavior. Parameters of the integrated circuit devices may vary as a function of other environmental factors (e.g., strain and aging) that cause electrical nonlinearities, thereby changing the operational characteristics of the device and affect the achievable accuracy of a sensor. Although a resulting parameter shift may have an expected value, it can be unpredictable.

For example, typical devices used for sensing temperature have high sensitivity to mechanical strain. In general, strain is a change in element length $\Delta L$ over the original element unit length L (e.g., $S=\Delta L/L$). Packaging stress may cause strain on an integrated circuit die, resulting in a shift in electronic behavior of temperature sensing devices. If any strain on the integrated circuit die is not properly calibrated then an apparent shift in temperature may occur in the temperature sensor of the integrated circuit die and will therefore reduce the accuracy of a sensed temperature. Although strain sensors can be included in a system on the integrated circuit to compensate for these effects, the practical implementation of such a compensation mechanism can be costly. Therefore, improved techniques for sensing temperature on an integrated circuit are desired.

SUMMARY OF EMBODIMENTS OF THE INVENTION

In at least one embodiment of the invention, an apparatus includes a thermistor having a variable resistance with a first dependence on absolute temperature. The apparatus includes a reference resistor having a reference resistance with a second dependence on absolute temperature, the second dependence being less than or having opposite polarity to the first dependence. The reference resistor includes a switched-capacitor circuit. The apparatus includes a node coupled between the thermistor and the reference resistor. The node is configured to provide a signal indicative of absolute temperature based on the variable resistance and the reference resistance. The signal may be strain-invariant, proportional to a reference voltage, and indicative of a ratio of the variable resistance to the reference resistance. The apparatus may include a feedback circuit configured to maintain the node at a predetermined voltage level. The feedback circuit may include an operational amplifier configured to receive the signal from the node at a virtual ground of the operational amplifier. The predetermined voltage level may be zero Volts.

In at least one embodiment of the invention, a method includes providing a variable resistance having a first dependence on absolute temperature. The method includes providing a reference resistance having a second dependence on absolute temperature by transferring charge from a first node to a second node at a switching frequency in response to first and second control signals. The second dependence is less than or has polarity opposite to the first dependence. The method includes generating a signal indicative of absolute temperature. The signal is based on the variable resistance and the reference resistance. The signal may be strain-invariant, proportional to a reference voltage, and indicative of a ratio of the variable resistance to the reference resistance. The method may include generating a feedback signal configured to maintain the signal at a predetermined level. The method may include converting the signal to a digital signal using a reference voltage proportional to a reference voltage used to generate the signal.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
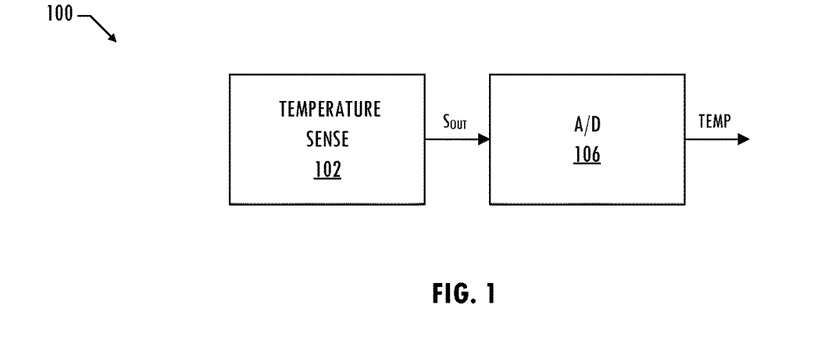
FIG. 1 illustrates a functional block diagram of an integrated circuit temperature sensing system.
Figure 2:
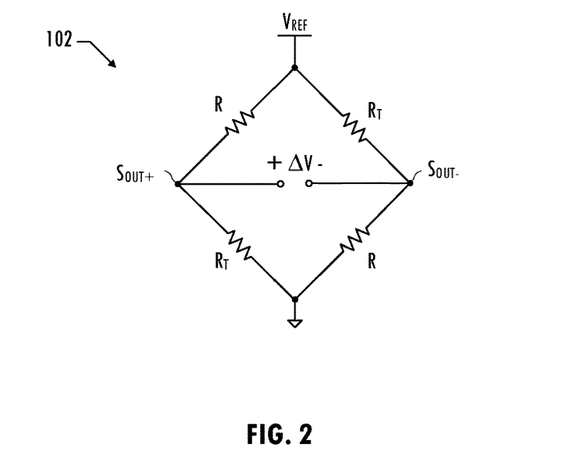
FIG. 2 illustrates a circuit diagram of an exemplary temperature sensing circuit of the integrated circuit temperature sensing system of FIG. 1.

Referring to FIG. 1, exemplary temperature sensor system 100 includes a temperature sensing module 102 that generates a signal, $S_{OUT}$, indicative of absolute temperature. Analog-to-digital converter 106 converts the signal $S_{OUT}$ to a digital value, TEMP. That digital value may be used to adjust parameters of an integrated circuit system (e.g., compensating for frequency dependence on temperature of a microelectromechanical systems (MEMS) resonator). FIG. 2 illustrates a conventional temperature sensing circuit 102, which includes a resistive bridge circuit. The resistive bridge circuit compares a resistance $R_T$ of temperature sensitive resistors to a resistance R of reference resistors to generate a differential DC output signal, $S_{OUT}^+$ and $S_{OUT}^-$. The output voltage $\Delta V$ is approximately $$V_{REF}\left(\frac{R_T - R}{R_T + R}\right),$$

where $V_{REF}$ is the head voltage of the bridge circuit. In a typical temperature sensor, the resistance R is chosen to be approximately the same as resistance $R_T$ at a nominal temperature (e.g., $T_O$=25° C.) resulting in $\Delta V$ being approximately zero Volts at the nominal temperature.

Although it may be desirable to select the reference resistor with a resistance R having a temperature dependence opposite to temperature dependence of resistance $R_T$ (e.g., −3600 parts-per million per degree Celsius (i.e., ppm/° C.)), in reality, such resistors are not readily available in a typical integrated circuit manufacturing process. Instead, a reference resistor is chosen to have a resistance R with a temperature dependence that is as negative as practicable (e.g., n+ polysilicon resistors having a resistance R with a temperature dependence of approximately −900 ppm/° C.). Resistance R is more weakly dependent on temperature as compared to resistance $R_T$. As a result, resistance R may be considered as operating as a reference resistance while the temperature dependence of resistance $R_T$ dominates the temperature dependence of differential voltage $\Delta V$. Accordingly, differential voltage $\Delta V$ indicates the change in resistance $R_T$ due to temperature relative to the reference resistance R. Note that since the first-order temperature effects dominate the temperature behavior of resistors, the discussion included herein applies only to first order temperature effects and is not intended to address higher-order temperature effects.

The differential voltage $\Delta V$ will indicate any mismatch between the actual resistance R and the actual resistance $R_T$. For example, at a maximum temperature (e.g., 85° C.), the differential voltage $\Delta V$ will be positive and at a minimum temperature (e.g., −40° C.), the differential voltage $\Delta V$ will be negative. Ideally, the differential voltage $\Delta V$ is a linear function of temperature. Although $R_T$−R and $R_T$+R are linear functions of temperature, $\Delta V$ does not have a perfectly linear temperature dependence.

An actual reference resistor having resistance R may have non-idealities associated with it that reduce the accuracy of the sensed temperature. In some applications, absolute accuracy of the sensed temperature is not required, but rather correspondence of a particular sensed temperature to a particular frequency of operation of a system is sufficient and any non-idealities may be calibrated out. For example, a MEMS resonator application has a temperature coefficient of approximately 10 ppm/° C. Apparent changes in temperature impact the accuracy of the system. If an apparent temperature change is 1° C., then frequency must be changed by 10 ppm. However, changes in the sensed temperature due to effects unrelated to temperature may still be problematic for the system. Even if there is no actual temperature change, the product specifications for the MEMS resonator must account for the effects of strain or aging on the reference resistor of the temperature sensor and the system may only be accurate to within +/−20 ppm. Accordingly, an ideal reference resistor has a resistance R that is insensitive to aging and mechanical strain.

In at least one embodiment of temperature sensing module 102, the bridge circuit uses polysilicon resistors to implement reference resistance R and temperature-sensitive resistors, i.e., thermistors to implement PTAT resistance, $R_T$. Polysilicon resistors typically have highly linear resistances and are designed to have small temperature coefficients. However, polysilicon resistors are sensitive to aging and strain due to their polycrystalline structure. In other embodiments of temperature sensing module 102, the reference resistances are implemented using diffusion resistors, which are less commonly used due to their large voltage and temperature coefficients, but are less prone to aging. However, diffusion resistors have resistances with a greater temperature coefficient than the temperature coefficient of resistance of a polysilicon resistor. Thus, use of diffusion resistors as reference resistors reduces circuit sensitivity and reduces the value of differential voltage $\Delta V$. This tradeoff may result in higher power consumption in associated sensing circuits (e.g., an analog-to-digital converter circuit) for a particular signal-to-noise ratio. Diffusion and polysilicon resistors are also considered piezoresistive, i.e., sensitive to strain. Although circuits that use thin film polysilicon resistors or diffusion resistors are relatively low cost, the response of those resistors to mechanical strain and/or aging degrades the accuracy of the temperature measurement. Use of strain sensors to sense and compensate for the effects of mechanical strain on diffusion or polysilicon reference resistors may consume a non-trivial amount of power and area while also increasing system complexity.

Figure 3:
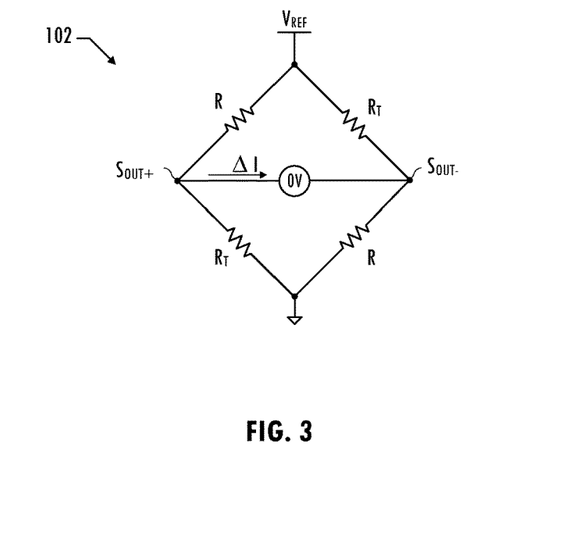
FIG. 3 illustrates a circuit diagram of an exemplary temperature sensing circuit of the integrated circuit temperature sensing system of FIG. 1, consistent with at least one embodiment of the invention.
Figure 4:
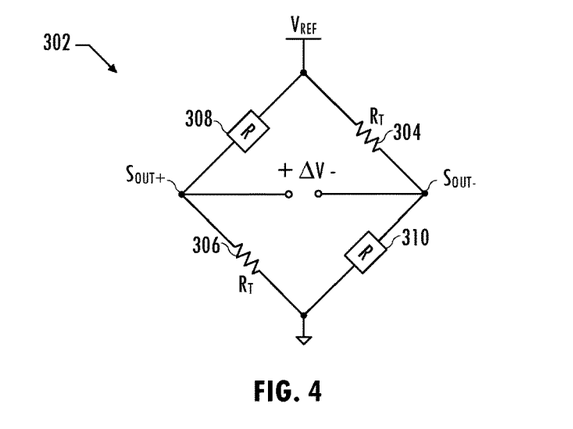
FIG. 4 illustrates a circuit diagram of an exemplary temperature sensing circuit of the integrated circuit temperature sensing system of FIG. 1, consistent with at least one embodiment of the invention.

Referring to FIG. 4, rather than use typical integrated circuit reference resistors, temperature sensor resistive bridge 302 includes reference resistors 308 and 310, which provide strain-invariant resistances. Reference resistors 308 and 310 may include current sources derived from temperature insensitive, strain-invariant circuits that provide currents that are proportional to the bias voltage, e.g., $I=\alpha V_{REF}$, to maintain ratiometric operation. In addition, note that using reference current sources to realize the reference resistances (e.g., devices M2 and M5 of FIG. 9) increases the sensitivity of the bridge circuit by a factor of two at the point where the bridge is balanced (i.e., $T_O$, e.g., 25° C.) because the current sources are high impedances and do not load the bridge circuit and eliminate the resistor divider of the bridge circuits of FIGS. 2 and 3. Referring back to FIGS. 4 and 5, reference resistances 308 and 310 may be implemented using current sources having a P-type metal-oxide-semiconductor (i.e., PMOS) current source for reference resistance 308 coupled to $V_{REF}$ and an N-type metal-oxide-semiconductor (i.e., NMOS) current source for reference resistance 310 coupled to a ground node. In other embodiments, bootstrapped, switched-capacitor based current sources, or other suitable current sources may be included in reference resistances 308 and 310.

Reference resistances 308 and 310 may include a reference resistor. $R_{T_o}$, used in voltage-to-current conversion. If the current sources of FIG. 4 are a weak function of temperature, output signal $\Delta V$ will have a more linear response with respect to temperature than $\Delta V$ of FIG. 2. Since resistivity is proportional to absolute temperature in metal resistors so to obtain a linear function for $\Delta V$, a resistance that has little or no dependence on temperature in numerator or denominator improves the linearity of operation, reference resistances 308 and 310 are designed to be centered at the temperature where the bridge is balanced (i.e., $\Delta V$=0 at temperature $T_0$ by choosing the reference resistor $R=R_T(T_o)$, where $T_0$ is, e.g., 25° C.). This may be achieved by choosing $\alpha$ to be $$\frac{1}{R_{T_o}}.$$

Referring to FIG. 4, a realization of the reference resistances are coupled to thermistors 304 and 306, in a Wheatstone bridge configuration and coupled to a voltage reference node and a ground node, respectively. As a result, the output voltage is approximately $\Delta V = V_{BIAS}(2 \propto R_T - 1)$, where $$\propto = \frac{1}{R_{T_o}}.$$

Accordingly, $$\Delta V \approx V_{BIAS}\left(\frac{R_T - R_{T_o}}{R_{T_o}}\right).$$

Figure 5:
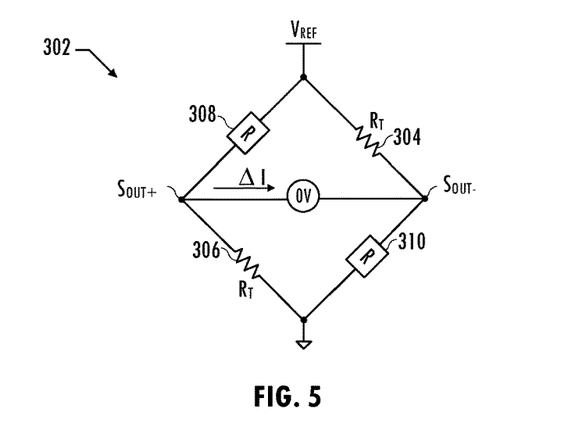
FIG. 5 illustrates a circuit diagram of an exemplary temperature sensing circuit of the integrated circuit temperature sensing system of FIG. 1, consistent with at least one embodiment of the invention.
Figure 6A:
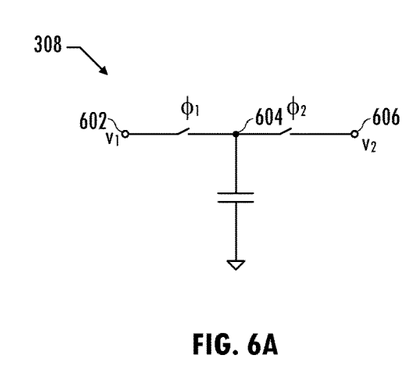
FIG. 6A illustrates a circuit diagram of an exemplary switched-capacitor reference resistance of the temperature sensing circuit of FIGS. 4 and 5, consistent with at least one embodiment of the invention.
Figure 6B:
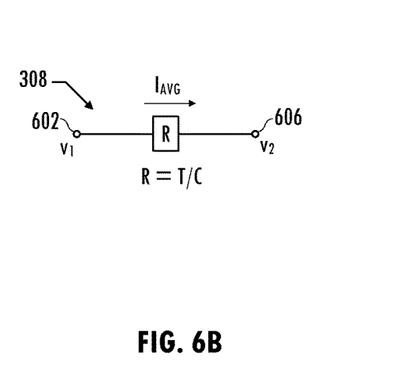
FIG. 6B illustrates an equivalent circuit of the exemplary switched-capacitor reference resistance of FIG. 6A, consistent with at least one embodiment of the invention.

In at least one embodiment of the bridge circuits of FIGS. 4 and 5, reference resistors 308 and 310 include switched-capacitor resistances. Referring to FIGS. 6A and 6B, exemplary reference resistance 308 includes a switched-capacitor resistor driven by a two-phase clock, having phases $\phi_1$ and $\phi_2$, or other non-overlapping clocks having a low strain sensitivity. For example, the two-phase clock may be generated using a MEMS-based clock, an LC oscillator-based clock, a crystal-based clock, or other suitable clock having a frequency with a low sensitivity to strain and aging. When $\phi_1$ closes the switch, the capacitor charges node 604 to the voltage on node 602, $v_1$. When the first phase ends, the switch opens and the second switch closes in response to $\phi_2$, the capacitor needs to hold an amount of charge equal to $C \times v_2$. The reference resistance conveys current from node 604 to node 606. The reference resistance is approximately the period of the clock, $\tau$, divided by the capacitance C, (e.g., $R = \tau/C$) resulting in an average current through the reference resistance $I_{AVG} = (v_2 - v_1)(\tau/C)$. As long as capacitance C is not a function of strain or aging and $\tau$ is not a function of strain or aging, temperature sensors including bridge circuits 302 of FIGS. 4 and 5 including switched-capacitor resistors as reference resistors 308 and 310 are less sensitive to strain and aging than bridge circuits 102 including typical integrated circuit reference resistors of FIGS. 2 and 3. Referring back to FIGS. 4 and 5, the capacitors included in the switched-capacitor resistors used by reference resistors 308 and 310 may include a finger capacitor embedded in SiO$_2$ or a capacitor formed in a MEMS structural layer, or other suitable capacitor. The capacitor may be designed to cancel any residual strain effects by orienting two capacitors rotated 90 degrees from each other to form a composite capacitor. In other embodiments, the capacitor may be bootstrapped relative to changing voltage across it causing the capacitor to behave more like a current source load on the bridge circuit than a resistor, thus improving bridge sensitivity to temperature.

Still referring to FIGS. 4 and 5, variable resistance $R_T$ of thermistors 304 and 306 is selected to be a strong PTAT resistance (e.g., metal resistors or silicided-polysilicon resistors). An exemplary metal resistor has a variable resistance $R_T$ with a temperature dependence of approximately 3600 ppm/° C. Some thermistors may be affected by strain or aging. However, although metal resistors exhibit little or no effects of aging and may be affected by strain on geometry, the material is not piezoresistive and therefore the effects of strain on the resistance are trivial. Since there is little or no expectation of deformation of geometry because typical metal resistors are fixed by surrounding SiO$_2$, the resulting conductivity of a metal resistor is substantially unchanged in response to strain on geometry.

Metal resistors are not commonly used in conventional analog circuits since metal layers in typical CMOS processes are intended to provide low-resistance interconnects and thus have very low sheet resistance. The low sheet resistance (e.g., 60 milli-Ohms per square) requires resistors having a large area to implement even small resistances (e.g., 10-20 kilo-Ohms). However, a stack of multiple metal layers coupled by conductive via(s) of a CMOS process may be configured as electrically coupled metal resistors that have reduced area as compared to a typical CMOS metal resistor, (e.g., a planar resistor formed using a narrow, serpentine metal trace implemented using a single CMOS metal layer).

In at least one embodiment of the bridge circuit, the thermistors include silicided-polysilicon resistors, which are polysilicon resistors without the silicide blocked. Silicide is metal that is injected into the top of polysilicon or diffusion to decrease the sheet resistance. This means that thermistors of silicided-polysilicon resistors have a combination of polysilicon and metal resistor properties, which makes them close to a PTAT resistor. Silicided-polysilicon resistors are less sensitive to strain and aging than conventional CMOS resistors. Typical silicided-polysilicon resistors have higher sheet resistances than metal resistors (e.g., 10 times the typical sheet resistance of metal) and result in metal resistors with higher resistances for the same area (e.g., 100-200 kilo-Ohms). Although the thermistors of the bridge circuit of FIGS. 4 and 5 are illustrated as a single resistor, in other embodiments of a bridge circuit, each thermistor includes a network of individual thermistor elements and/or includes one or more silicided-polysilicon resistors.

Figure 9:
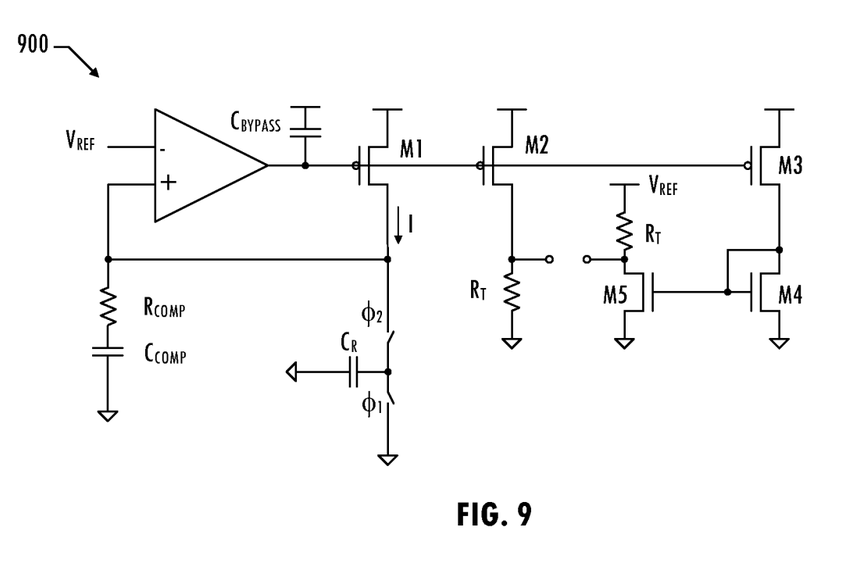
FIG. 9 illustrates a circuit diagram of an exemplary voltage-to-current converter circuit with a switched-capacitor reference resistance consistent with at least one embodiment of the invention.

Referring to FIG. 9, in at least one embodiment of a temperature sensor configured to generate a strain-invariant signal, rather than generating a voltage from switched-capacitor resistors, as illustrated in FIGS. 4 and 5, an arrangement includes thermistors having variable resistances $R_T$ coupled in a bridge configuration with current source circuits that derive current from switched-capacitor resistors, i.e., circuits that generate current I that is proportional to the switched-capacitor resistance. Current mirroring techniques are used to provide a current that is proportional to the ratio of $V_{REF}$ and the equivalent current I generated by the switched-capacitor to the bridge circuit including the thermistors.

Figure 7:
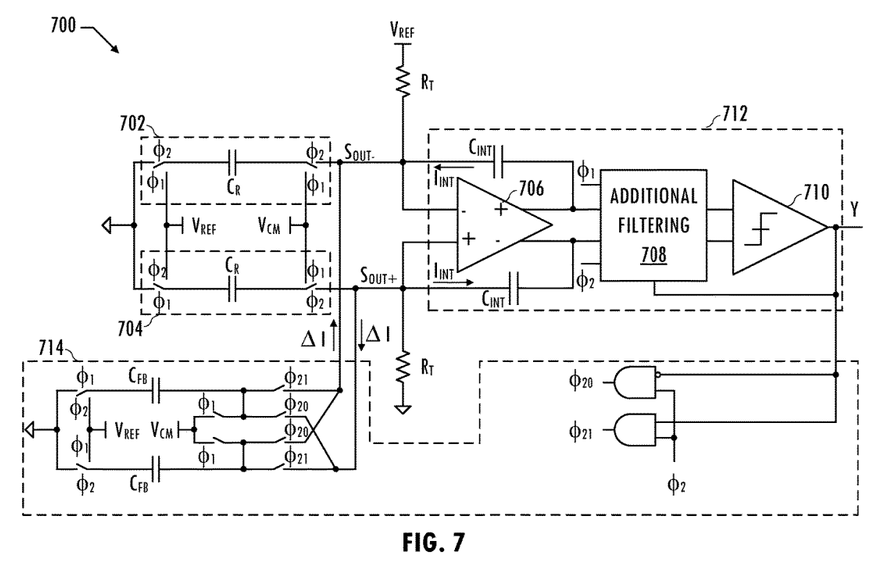
FIG. 7 illustrates a circuit diagram of an exemplary temperature sensing circuit including a switched-capacitor reference resistance consistent with at least one embodiment of the invention.

Referring to FIG. 7, an exemplary implementation of a strain-insensitive temperature sensor includes an arrangement (e.g., a Wheatstone bridge circuit) of thermistors having variable resistances $R_T$ and reference resistors including switched-capacitor resistors, formed from capacitors having capacitances $C_R$, that produce a signal that is proportional to a reference voltage and is indicative of the ratio of the thermistor resistance to the switched-capacitor resistance. Circuit 700 uses the virtual ground of operational amplifier 706 of analog-to-digital converter 712 to convert a voltage produced by the bridge circuit to a current. That current is indicative of the ratio of the thermistor resistance to the switched-capacitor resistance. Rather than use an arrangement of thermistors and switched-capacitor resistors to generate a voltage proportional to a reference voltage and that is a function of the ratio of the variable resistance to the reference resistance, and provide that voltage to analog-todigital converter, circuit 700 converts the ratio to a digital signal directly, thus eliminating input sampling capacitors that would introduce additional noise. Circuit 700 uses filter 708 and quantizer 710 to generate an output binary sequence. Y, having a density of ones that causes mean(Y)=1−R/(2×$R_T$), where $C_{FB}$=$C_R$. That is, circuit 700 directly digitizes the ratio of the resistance of the switched-capacitor resistor and the resistance of the thermistor. Output binary sequence Y is provided to circuit 714, which may generate a feedback signal using additional switched-capacitor circuits. The feedback signal is provided to $S_{OUT}^+$ and $S_{OUT}^-$ to maintain the node at a predetermined level.

Chopping or auto-zeroing techniques may be used on the differential amplifier 706 to reduce or eliminate its offset voltage and low frequency noise (e.g., flicker noise) so that the average voltage across the bridge circuit is approximately 0V (e.g., $S_{OUT}^+$−$S_{OUT}^-$=0V). The analog-to-digital converter converts the output signal of the bridge circuit to a digital signal using a reference voltage proportional or equal to a reference voltage used to generate the strain-invariant signal. Thus, the dependency of the output signal on the reference voltage is reduced or eliminated.

Figure 8:
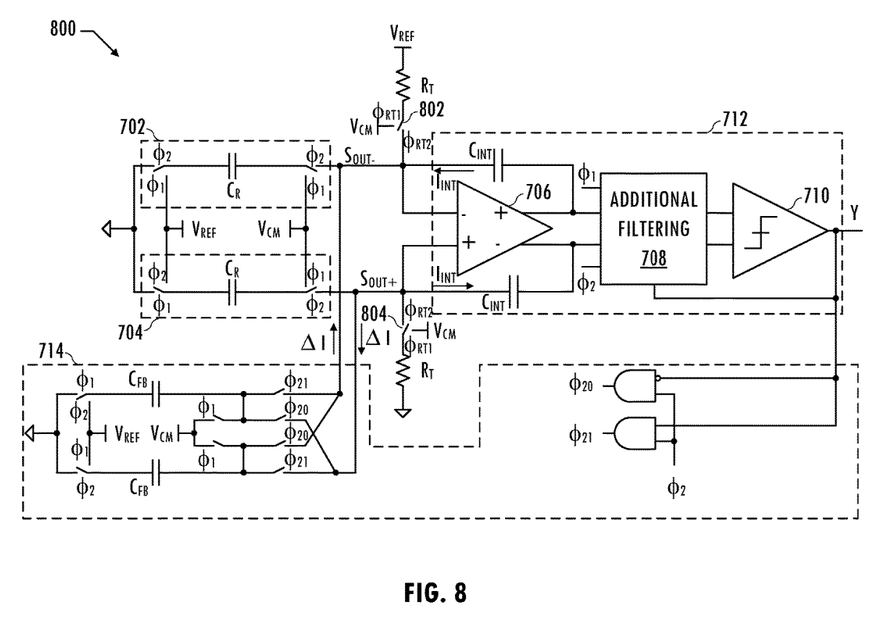
FIG. 8 illustrates a circuit diagram of an exemplary temperature sensing circuit including a switched-capacitor reference resistance and a switched variable resistance consistent with at least one embodiment of the invention.

Referring to FIG. 8, in at least one embodiment of a temperature sensor configured to generate a strain-invariant signal, the bridge circuit of thermistors having variable resistances $R_T$ and switched-capacitor resistors formed from capacitors having capacitances $C_R$, produce a signal that is proportional to a reference voltage and is indicative of the ratio of the thermistor resistance to the switched-capacitor resistance. However, unlike circuit 700 of FIG. 7, circuit 800 of FIG. 8 includes switches 802 and 804 coupled in series with corresponding thermistors. This embodiment may benefit from reduced circuit area and reduced buffering requirements for the switched-capacitor if charge injection and the error resulting from the difference between the closed period of time and the open period of time of switches 802 and 804 is sufficiently managed. Those benefits may be increased by reducing the duty cycle of $\phi_{RT2}$, which is used to close switches 802 and 804, as compared to the duty cycle of $\phi_{RT1}$ (e.g., the duty cycle of $\phi_{RT2}$ being half the duty cycle of $\phi_{RT1}$), by closing switches 802 and 804 once for each alternate high value of $\phi_{RT1}$, or some other suitable effective reduced duty cycle of $\phi_{RT2}$ as compared to the duty cycle of $\phi_{RT1}$.

Thus various embodiments of a temperature sensor that is invariant to strain and aging are disclosed. The description of the invention set forth herein is illustrative, and is not intended to limit the scope of the invention as set forth in the following claims. For example, while the invention has been described in an embodiment in which a Wheatstone bridge circuit configuration of thermistor resistors and switched-capacitor resistors are used, one of skill in the art will appreciate that the teachings herein can be utilized in other arrangements of thermistors and strain-invariant reference resistors that produce a signal that is indicative of the ratio of the variable resistance to the reference resistance. Variations and modifications of the embodiments disclosed herein, may be made based on the description set forth herein, without departing from the scope and spirit of the invention as set forth in the following claims.

What is claimed is:

1. An apparatus comprising:
a thermistor having a variable resistance with a first dependence on absolute temperature;
a reference resistor having a reference resistance with a second dependence on absolute temperature, the second dependence being less than or having opposite polarity to the first dependence, the reference resistor comprising a switched-capacitor circuit;
a second thermistor having the variable resistance with the first dependence on absolute temperature, the second thermistor and the reference resistor being coupled to a first voltage reference node;
a second reference resistor having the reference resistance with the second dependence on absolute temperature, the second reference resistor comprising a second switched-capacitor circuit, the thermistor and the second reference resistor being coupled to a second voltage reference node;
a first node coupled between the thermistor and the reference resistor;
a second node coupled between the second thermistor and the second reference resistor, the first node and the second node being configured to provide a signal indicative of absolute temperature based on the variable resistance and the reference resistance; and
a feedback circuit coupled to the first node and the second node, the feedback circuit comprising a third switched-capacitor circuit and a fourth switched-capacitor circuit, the third switched-capacitor circuit and the fourth switched-capacitor circuit each being controlled by a control signal generated based on the signal.

2. The apparatus, as recited in claim 1, wherein the signal is strain-invariant, is proportional to a reference voltage, and is indicative of a ratio of the variable resistance to the reference resistance.

3. The apparatus, as recited in claim 1,
wherein the feedback circuit is configured to maintain the first node at a predetermined voltage level.

4. The apparatus, as recited in claim 3, wherein the control signal is generated by logically combining a second control signal used to control the switched-capacitor circuit and the second switched-capacitor circuit and an output binary sequence based on the signal.

5. The apparatus, as recited in claim 3, wherein the predetermined voltage level is a constant voltage level and the feedback circuit senses a change in current.

6. The apparatus, as recited in claim 3, wherein the feedback circuit comprises:
an operational amplifier configured to receive the signal at a virtual ground of the operational amplifier, wherein the predetermined voltage level is zero Volts.

7. The apparatus, as recited in claim 3, wherein a reference voltage of the feedback circuit is proportional to a reference voltage coupled to a bridge circuit including the thermistor, the second thermistor, the reference resistor, and the second reference resistor.

8. The apparatus, as recited in claim 1, wherein the switched-capacitor circuit is configured as a switched-capacitor resistor.

9. The apparatus, as recited in claim 1, wherein the switched-capacitor circuit is configured as a switched-capacitor current source.

10. The apparatus, as recited in claim 1, wherein the thermistor comprises a metal resistor having a resistivity that is approximately proportional to temperature.

11. The apparatus, as recited in claim 1, wherein the thermistor is a silicided polysilicon resistor having a resistivity that is approximately proportional to temperature.

12. The apparatus, as recited in claim 1, wherein the signal indicative of absolute temperature indicates a change in the variable resistance due to temperature relative to the reference resistance and is proportional to $$\left(\frac{R_T - R}{R_T + R}\right),$$

where $R_T$ is the variable resistance and R is the reference resistance.

13. The apparatus, as recited in claim 1, further comprising:
 a first switch coupled in series with the thermistor and the first node, the first switch being configured to couple the thermistor to the first node during a first period of time with a first duty cycle and to couple the thermistor to a common mode voltage during a second period of time with a second duty cycle; and
 a second switch coupled in series with the second thermistor and the second node, the second switch being configured to couple the second thermistor to the second node during the first period of time with the first duty cycle and to couple the second thermistor to the common mode voltage during the second period of time with the second duty cycle.

14. The apparatus, as recited in claim 13, wherein the second duty cycle is less than the first duty cycle.

15. The apparatus, as recited in claim 13, wherein the second duty cycle is half the first duty cycle.

16. The apparatus, as recited in claim 1, wherein the switched-capacitor circuit and the second switched-capacitor circuit transfer charge at a switching frequency in response to a second control signal and a third control signal.

17. The apparatus, as recited in claim 16, wherein the second control signal and the third control signal are non-overlapping clock signals.

\* \* \* \* \*